United States Patent [19]
Rao et al.

[11] 4,207,660
[45] Jun. 17, 1980

[54] METHOD OF MAKING LOW COST INSERTABLE TYPE PORT LINER

[75] Inventors: Vemulapalli D. N. Rao, Bloomfield Township, Oakland County; Angelo Jaimee, Farmington Hills; Benjamin T. Howes, Birmingham, all of Mich.

[73] Assignee: Ford Motor Company, Dearborn, Mich.

[21] Appl. No.: 954,798

[22] Filed: Oct. 25, 1978

Related U.S. Application Data

[62] Division of Ser. No. 849,728, Nov. 9, 1977.

[51] Int. Cl.[2] .............................. B23P 15/00
[52] U.S. Cl. ...................... 29/156.4 WL; 29/455 R; 29/458; 29/460; 60/322; 123/193 H; 138/149
[58] Field of Search ................. 29/156.4 WL, 455 R, 29/458, 460; 60/200 A, 282, 322; 123/193 H; 138/141, 149

[56] References Cited

U.S. PATENT DOCUMENTS

| | | | |
|---|---|---|---|
| 2,170,015 | 8/1939 | Ford | 29/156.4 WL UX |
| 3,001,767 | 9/1961 | Straubing | 29/455 R UX |
| 3,299,417 | 1/1967 | Sibthorpe | 29/455 R X |
| 3,448,505 | 6/1969 | De Coye De Castelet | 29/455 R X |
| 3,490,122 | 1/1970 | Hunder et al. | 29/455 X |
| 4,031,699 | 6/1977 | Suga et al. | 123/193 H X |
| 4,075,836 | 2/1978 | Yamazaki et al. | 60/282 |
| 4,103,487 | 8/1978 | Yamazaki et al. | 123/193 H X |
| 4,106,288 | 8/1978 | Nagaishi et al. | 60/282 |
| 4,123,902 | 11/1978 | Iida | 60/282 |

Primary Examiner—Charlie T. Moon
Attorney, Agent, or Firm—Joseph W. Malleck; Keith L. Zerschling

[57] ABSTRACT

A method and apparatus for insulating the exhaust passage of an internal combustion engine is disclosed. A three-zone liner assembly is provided with an outer zone comprised of a room temperature vulcanizing silicone sleeve, an inner zone comprised of a stamped and seam welded high strength Al-Cr-steel alloy, and an intermediate zone consisting of a ceramic wool mat. The liner assembly is supported or enclosed within a mild carbon sheet metal sleeve metal which in turn may be bonded to the engine passage wall by use of a room-temperature-vulcanized silicone if of the insert type, or by fusion bonding during casting if of the cast-in-place type.

2 Claims, 3 Drawing Figures

METHOD OF MAKING LOW COST INSERTABLE TYPE PORT LINER

This is a division of application Ser. No. 849,728, filed Nov. 9, 1977.

BACKGROUND OF THE INVENTION

With the advent of stricter governmental controls for engine emissions and increased concern to reduce weight of passenger vehicles, there arises a need for conserving the residual heat of exhaust gases of an internal combustion engine so that downstream equipment in a vehicle exhaust system may operate with higher efficiency and effectiveness to reduce the emission levels of the engine and conserve fuel. This need has become quite apparent to the automotive industry and is currently under intense development effort. Any solution to this problem must be simple, durable, and yet not introduce any additional problems.

Heat loss, experienced by the exhaust gases as they travel from the combustion zone through the exhaust passage of the engine block, can be considerable. Such heat loss is accomplished by conduction, convection and radiation. Minimizing heat loss within the exhaust passage is important for at least two principal reasons, (a) to maintain a high temperature of the exhaust gases therein to induce oxidation, and (b) to reduce the heat loss to the surrounding coolant in the block and head so as not to prematurely dissipate an unduly large number of heat units.

The prior art has approached such problems in principally three modes comprising: (1) use of cast-in-place type liners which have been either of the single metal layer or single refractory element design, or dual metal or refractory layers; (2) the use of insertable type liners which are added independently of the fabrication of the engine housing, such liners also being of the single layer heat resistant alloy metal design or double layer metal design or multiple layers of ceramic including air spaces or foamable paste therebetween; and (3) the use of applied coatings directly to the prefabricated engine housing passage walls, including asbestos and other ceramic materials. The disadvantage to employing cast-in-place type liners to date has been principally a lack of bonding; shrinkage and solidification of the cast metal around the liner has lead to localized poor bonding and/or separation which eventually provides for leaks and inadequate insulation. The principal disadvantage to the insertable type liner is that they insufficiently control heat transfer by not conforming closely to the wall of the exhaust passage resulting in a poorly trapped air space and a reduction in the insulating factor resulting from sealing difficulties. Coatings have proved disadvantageous because of their fragile nature which is particularly troublesome when the cast housing is subjected to post mechanical or chemical treatments tending to fracture or chip such coatings. Moreover, such coatings require multiple steps which result in increased manufacturing costs.

SUMMARY OF THE INVENTION

A primary object of this invention is to provide a new and improved method of making exhaust passage insulating liners for an automotive engine, the method being characterized by (a) increased economy of fabrication and material while providing for improved bonding of the liner to other components of the engine system, and (b) has a decreased total coefficient of heat transfer from the exhaust passage wall compared to prior art liners.

Yet still another object of this invention is to provide a low cost heat insulating liner for the exhaust passage of an engine which liner not only minimizes heat transfer across the total thickness of the lining assembly but also provides a low specific heat at the inner structure of the liner to minimize chill to the exhaust gases passing therethrough particularly during a cold start. The inner structure should additionally provide increased resistance to oxidation at high temperatures.

Yet still another object of this invention is to provide an improved exhaust port liner meeting the above objects and which has an extended operating life of at least 5000 hours and is characterized by a high resistance to erosion both from chemicals and mechanical abrasion either during use or during fabrication of the engine housing.

Features pursuant to the above objects comprise (a) the use of a three zone liner wall assembly, (b) the supporting structure for the assembly is comprised of a mild carbon steel sleeve having by weight less then 0.06¢ carbon and less than 0.2% impurities, (c) an outer zone consisting essentially of a thin sleeve of room-temperature-curable silicone having a thermal conductivity of about 0.008 BTU (ft.)/hr.ft$^2$.° F., (d) an intermediate zone having trapped air spaces defined by foam or fiber wool, and (e) an innermost zone comprised of a weldable heat resistant and chemically resistant alloy consisting essentially of iron-chromium-aluminum.

DETAILED DESCRIPTION

Figure 1:
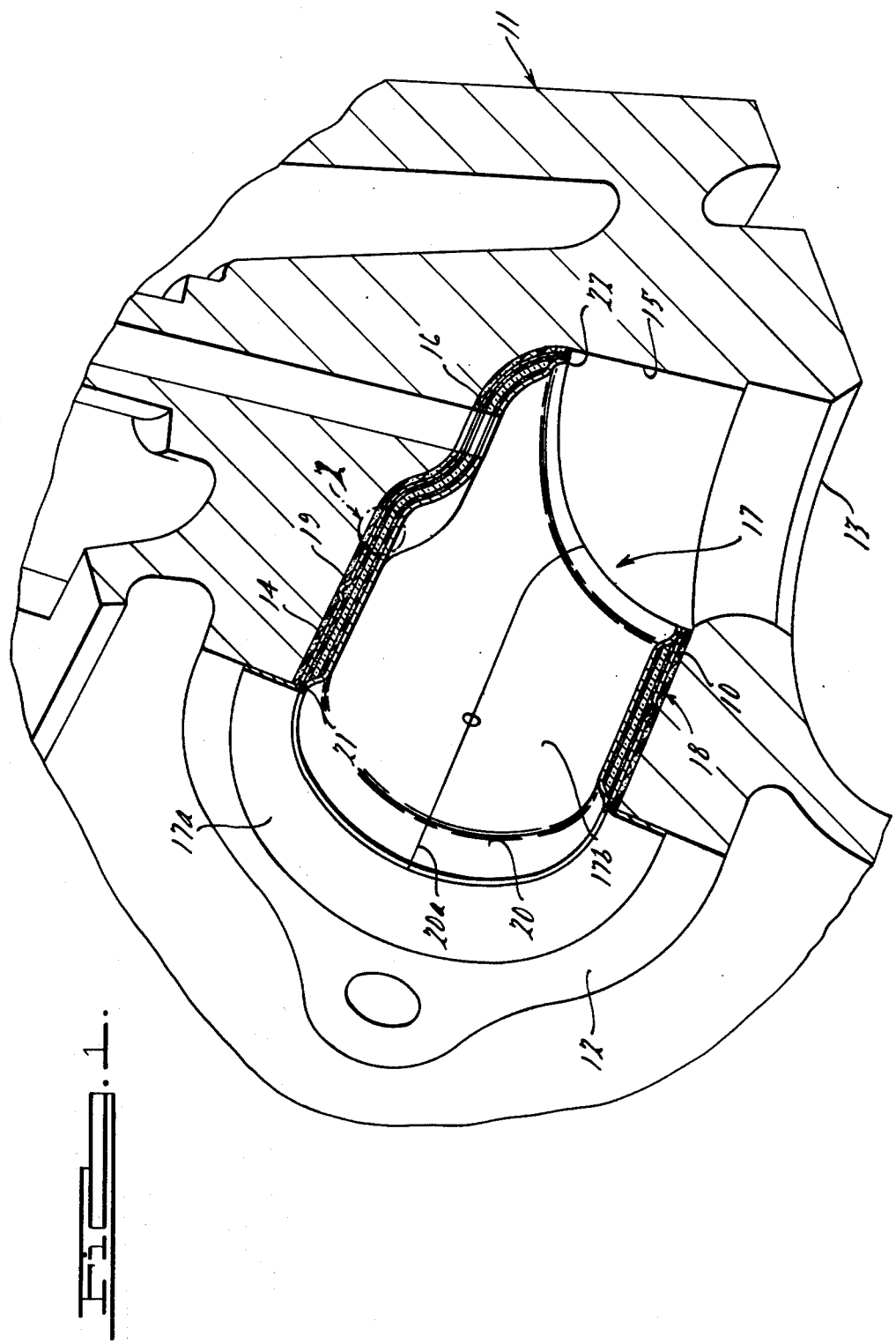
FIG. 1 is a sectional view of a portion of an engine housing illustrating the positioning of an insertable type liner according to the principles of this invention.

The purpose of the liner of this invention is to minimize the heat loss through the exhaust port walls thus increasing the exhaust gas temperature to induce hydrocarbon oxidation, improve the downstream thermal reactor and/or catalyst efficiency, reduce the heat transfer to the engine coolant, and to all of the above by way of a low cost assembly. To function as an efficient port liner, the materials and the construction of the liner walls must meet the following requirements for this invention: (a) the heat transfer across the assembly wall from the exhaust gases to the cast metal must be minimized, preferably to less than 25% of the heat loss experienced by an unlined passage, (b) the materials used in each zone of the assembly must be thermally stable at the gradient temperature experienced at each respective zone, (c) the inner skin material for the liner should (i) have a very low specific heat of about 0.10 BTU/lb./° F., to minimize chill to the exhaust gases during cold startup operations, (ii) have low thermal mass, (iii) possess good chemical oxidation resistance and withstand thermal temperatures up to 1600° F., and (iv) yield at least 3000 hours of service life in an engine exhaust environment. In addition, the supporting sleeve for the assembly should withstand the chemical erosion caused by the molten metal during casting if of the cast-in-place type assembly and the exposed surfaces of the liner should withstand the mechanical erosion caused by the exhaust gases or the mechanical shock and abrasion caused by shot-peening, employed during cleanup of the engine housing.

APPARATUS

To meet the above criteria, one preferred mode of the present invention provides for an exhaust port liner with at least three zones, the outermost zone A is comprised of a room-temperature-curing silicone resine, such as a solventless polysiloxane with a melting point of 200°–220° F. and a thermal conductivity of about 0.008 BTU.ft./hr.ft$^2$, °F. In the presence of a catalyst such as argon or metallics, the silicone is thermoset through the condensation of the hydroxyl groups. One such compound is polymethyl siloxane silicone made by General Electric or Dow Corning. The silicone is formed as a thin sleeve and is thermally stable at temperatures up to 200° F. which is the temperature environment for the thin layer juxtaposed to the water-cooled engine housing. The thickness of the silicone sleeve is about 0.01 inch or less.

The intermediate zone B is comprised of one or more trapped air spaces preferably occupied by ceramic fiber wool or mat such as aluminum silicate or cordierite (the latter is a ceramic consisting of magnesium aluminum silicate $2MgO.2Al_2O_3.5 SiO_2$, or other stable low thermal conductivity ceramic. The fiber may be employed in the mat form on collected wool; each form serves to define numerous trapped air spaces giving the intermediate zone a thermal conductivity value of 0.5 BTU.ft./hr.ft$^2$.°F. The ceramic is stable at temperatures of 400°–600° F. which are experienced in this zone.

The third or innermost zone C is comprised of an inner sheet metal skin, the metal consisting essentially of a low aluminum-chromium steel containing approximately 18% chromium, 2% or less aluminum, and the remainder iron. In some instances the alloy may contain a small amount of yttrium at about 0.5%. Such chemistry provides for a thermal conductivity of 12.5 BTU.ft./hr.ft$^2$.°F. and provides for weldability to the mild carbon steel outer skin while at the same time providing for resistance to chemical erosion at a relatively low cost. Because the inner skin has a high strength and is not deep-drawable, fabrication must be by stamping and subsequent welding along predetermined seams.

The supporting structure for the liner assembly, which is juxtaposed at passage wall and encloses the assembly, is comprised of a mild carbon sheet steel designed to have a melting temperature higher than the melting temperature of a cast iron engine housing into which the liner is implanted or inserted. The cast iron should be typically of the grey iron type having a chemistry consisting of 3–4% carbon, 1–2% silicon and the remainder Fe. For nodular iron, 0.5% or less MgO is present. The melting temperature for such a grey cast iron is about 1150°–1200° C. and the melting temperature for the low carbon sheet steel, required for this invention should be above 1500° C. To maintain such elevated melting temperature for the outer skin steel, the carbon content of the low carbon steel should be at 0.06% or less and impurities should be 0.2% or less. The steel sleeve prevents heat shorts which occur with prior art cast-in-place metal liners, since in the past the molten metal penetrated through the liner metal by solution creating metal-to-metal at heat shorts for thermal transfer.

Mounting of the three zones of the liner asembly to the supporting sleeve is promoted by welding of the inner skin to the support sleeve, as described later in connection with the method of making, thereby enveloping zones A and B. The intermediate zone B is held in place to the inner skin C during assembly or welding by the adhesive qualities of a silicone plastic coating which subsequently deteriorates under operating temperature conditions of liner use. Similarly, the adhesive qualities of the outer zone provides positioning as coating during assembly, but the integrity of later zone is maintained stable throughout the operating life of the liner since the use temperature at the zone A never exceeds 200° F.

Metal cost is a most important factor in the present automotive engine market; mild carbon steel has a current price range of about 5–10 cents per pound and it is possible to obtain supplies of low aluminum-chromium steel for the inner skin at a price level of about $1.40 per pound. All other chemically resistant sheet metals are considerably more expensive or not weldable for the purpose as stated above, or cannot withstand a 1200° F. temperature gradient which is necessary for the inner skin. Thus the selection of these two metals with their accompanying physical characteristics in combination serve an important economical consideration.

The sizing of the liner is relatively important, the outer skin A must have a thickness of 0.01 inches or less, the intermediate zone B should have a thickness in the range of 0.06–0.08 inches, the inner skin C should have a thickness of about 0.025–0.030 inches, and the supporting mild carbon steel sleeve should have a ply thickness of 0.015–0.018 inches for an insertable type liner, but 0.045–0.06 inches for a cast-in-place liner. The total assembly should have a thickness of about 0.125 inches across the three zones and steel sleeve; the clearance between the outer surface of the steel sleeve and the passage of the engine housing containing the liner, should be 0.015–0.05 inches if the liner is of the insertable type. This latter spacing is filled by a room-temperature-curing silicone applied as a coating before insertion. The average thermal conductivity for the steel sleeve and assembly will be about 1.5 BTU.ft./hr.ft$^2$.°F.

In the event the engine housing containing such liner is comprised of aluminum alloy, it will typically be an aluminum-silicon alloy having a melting temperature in the range of about 600° C. In that event the supporting sleeve will still be preferably comprised of plain carbon steel, although a substantially pure aluminum sheet metal having a thickness of about 0.025 may also be used. For cost reasons, however, the supporting sleeve should be low carbon iron, irrespective of whether a cast-in-place or insertable type liner.

METHOD—Insert Type

Figure 2:
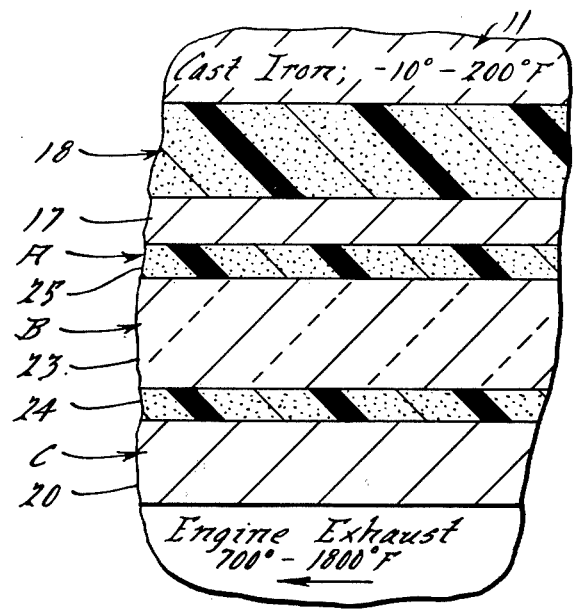
FIG. 2 is an enlarged fragment of the sectional view of the three zoned wall system of the liner displayed in FIG. 1.
Figure 3:
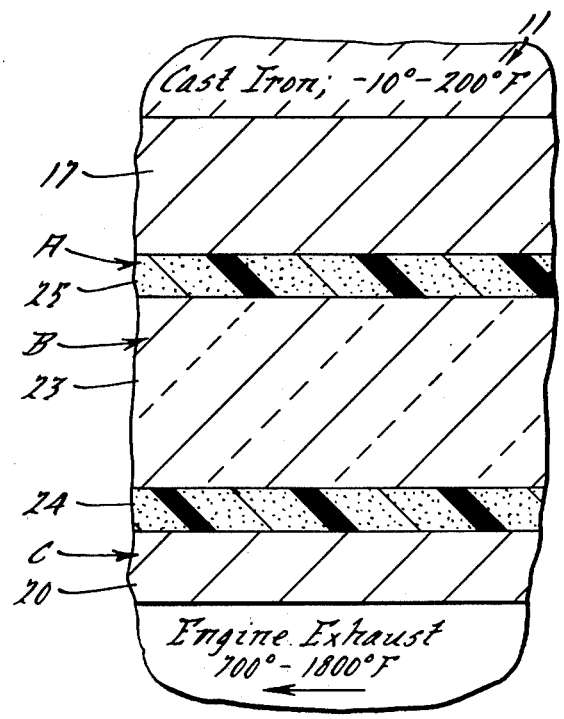
FIG. 3 is a view similar to FIG. 2, but illustrating a portion of a cast-in-place type liner assembly according to the principles of this invention.

A preferred method of fabricating a liner of the insert type, as illustrated in FIGS. 1–3, is as follows:

1. Form a sand core to define an exhaust passage 10 in a metal casting 11, the core providing for a predetermined passage configuration as shown in FIG. 1. The passage configuration is comprised of a cylinder 14 and an elbow 15 providing an abrupt turn at the innermost end; the elbow 15 is interrupted by a flattened shoulder 16 to provide a valve guide entrance. The core is adapted to extend from the sidewall 12 of the intended casting to the lowermost wall 13 of the intended casting, the planes of such walls being at an angle with respect to each other of about 75°. Several of these cores may be employed as a cluster to define a series of exhaust passages in accordance with conventional art.

2. After having placed the core in proper position within a mold, a casting for an engine head is formed thereabout using cast iron having a chemistry consisting of 3–4% carbon, 1–2% silicon and the remainder iron.

3. Male and female dies are formed to define a liner support sleeve 17. The two dies are employed to deep-draw a selected metal blank, the product of such deep-drawing producing a configuration conforming closely to the configuration of the cast exhaust passage with a substantially uniform clearance of about 0.015 inches. The support sleeve 17 has an annular flange 17a at one end adapted to abut and fit tightly against the outer sidewall 12 of the engine head; sleeve 17 has a cylindrical channel 17b adapted to extend from the flange into the elbow of the passage 10 adjacent its entrance.

4. Employing said male and female drawing dies, a blank of mild carbon steel having, by weight, less than 0.06% carbon and less than 0.2% impurities. The low carbon steel blank is drawn to the configuration as illustrated which extends in most cases a distance of 2–3 inches from the flange 17a.

5. Male and female stamping dies are defined to form an inner skin or zone C for said liner assembly. The inner skin is a metal cylinder 20 adapted to nest within the outer metal support sleeve 17 and provide for a predetermined spacing therebetween of about 0.08 inches, except at the leading and trailing portions where the metal sleeve and inner skin are brought together for joining and assembly.

6. Forming a cylinder with an open longitudinal seam 20, using the stamping dies. The cylinder of skin 20 conforms to the configuration of the sleeve 17 except that it is spaced inwardly said 0.08 inches. The inner skin 20 is formed from a blank of temperature resistant low aluminum-chromium steel. Preferably the chemistry should contain 18% chromium, 2% aluminum and the remainder iron; in some cases the addition of yttrium in an amount of about 0.5% may be desired. The seam 20 is closed by appropriate welding.

7. The completed inner and outer skins are brought together for assembly at the leading and trailing portions 21–22 and are spot welded together.

8. Prior to welding, a mat of ceramic fiber is implanted between the skins and held in position temporarily, particularly during welding, by use of a room-temperature-curable silicone rubber compound. The compound is spread on the mat prior to implantation, both on the inner as well as outer surface of the mat to define two coatings 24 and 25 (the latter constituting the outer zone of the liner assembly); each at a thickness of 0.01 inches maximum.

9. After the support sleeve and inner skin have been welded together, the outer surface of the support sleeve 17 is also coated with a room-temperature curable silicone rubber compound, the coating 25 being in the thickness range of 0.010–0.050 inches.

10. The liner assembly is then inserted into the cast exhaust passage 10 so that flange 17a abuts the sidewall 12 of the casting and the silicone compound coating 25 is in intimate contact with the walls of the passage 10. Thus, the liner will be supported not only by the silicone compound coating throughout its longitudinal extent but also by the flange 17a which is secured to the casting such as by bolts.

METHOD—Cast-in-place

In the event the liner assembly is desired to be of the cast-in-place type, the fabrication method is modified so that the supporting sleeve 17 has a contour and dimension such that it will be entrained by the molten metal poured therearound and act as an anchored outer skin. The support sleeve, of course, will not carry any silicon coating because the molten metal will have an intimate metallurgical bond between the casting and the outer skin. The support sleeve 17 will maintain its integrity during casting because its melting temperature (1500° C.) will be adequately elevated beyond that of the temperature of the molten material to prevent dissolution. The molten cast iron should have a chemistry consisting of standard nodular iron grade or grey iron grade, thereby providing for a melting temperature of about 1200° C. The melting temperature of the support sleeve 17 will be greater than 1500° C. as mentioned earlier. The liner is, of course, prepared and assembled prior to being cast-in-place similar to the previous process for the insert type, except that when it is assembled it is employed as a core element and the molten metal cast therearound to mutually reach therewith and provide a tight metallurgical bond throughout the entire outer surface of sleeve 17. The positioning of the cast-in-place liner is illustrated in FIG. 3.

We claim:

1. A method of forming an insertable type of heat insulating liner assembly for use in an internal combustion engine having an outer face and an elbowed exhaust passage extending through said face, comprising:
   (a) deep-drawing a blank of plain carbon steel, having a carbon content less than 0.06% and less than 0.2% impurities, said drawn blank defining a cylindrical outer metal sleeve conforming to the inner contours of said exhaust passage less 0.015 inches, said sleeve having a flange for engagement with the outer face of said engine,
   (b) stamping a blank of aluminum-chromium steel into a cylindrical configuration having a longitudinal seam, and closing said seam by welding to form an inner metal sleeve conforming to the inner contours of said outer sleeve but spaced therefrom a distance of about 0.080 inches except at leading and trailing margins thereof viewed with respect to the longitudinal extent of the inner sleeve,
   (c) welding said inner and outer sleeves together at said leading and trailing margins of said inner sleeve to form a liner assembly,
   (d) implanting a sleeve of insulating refractory fibers within the space between said sleeves prior to welding, said insulation sleeve having coated thereon a uniform layer of silicone plastic along at least the outer periphery thereof,
   (e) coating the outer sleeve of the assembly on the exterior thereof with a room temperature curable vulcanizing silicone, and
   (f) immediately inserting said coated assembly into said exhaust passage with the coating of the outer sleeve in intimate contact with the surface of said exhaust passage.

2. A method as in claim 1 in which the outer metal sleeve is formed to extend at least partially into the elbow of the exhaust passage and the thickness of the silicone coating along the outer periphery of said insulation fiber being about 0.01 inches and said silicone plastic having a melting temperature no less than 250° F.

* * * * *